(12) United States Patent
Jones et al.

(10) Patent No.: US 7,620,889 B2
(45) Date of Patent: Nov. 17, 2009

(54) METHOD AND SYSTEM FOR LINKING DATA RANGES OF A COMPUTER-GENERATED DOCUMENT WITH ASSOCIATED EXTENSIBLE MARKUP LANGUAGE ELEMENTS

(75) Inventors: Brian Jones, Redmond, WA (US);
Robert Little, Redmond, WA (US);
Shawn Alan Villaron, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 11/018,569

(22) Filed: Dec. 20, 2004

(65) Prior Publication Data

US 2006/0136812 A1   Jun. 22, 2006

(51) Int. Cl.
*G06F 17/21* (2006.01)
*G06F 17/24* (2006.01)

(52) U.S. Cl. .................. 715/234; 715/243; 715/248; 715/271; 715/272

(58) Field of Classification Search .............. 715/513, 715/517, 522, 539, 234, 243, 248, 271, 272
See application file for complete search history.

(56) References Cited

U.S. PATENT DOCUMENTS

| | | | |
|---|---|---|---|
| 4,410,286 A | 10/1983 | Ko et al. | |
| 4,594,674 A | 6/1986 | Boulia et al. | |
| 4,649,513 A | 3/1987 | Martin et al. | |
| 4,870,611 A | 9/1989 | Martin et al. | |
| 5,222,205 A | 6/1993 | Larson et al. | |
| 5,267,155 A | 11/1993 | Buchanan et al. | |
| 5,469,533 A | 11/1995 | Dennis | |
| 5,487,138 A | 1/1996 | Rust et al. | |
| 5,537,526 A | 7/1996 | Anderson et al. | |
| 5,579,466 A | 11/1996 | Habib et al. | |
| 5,579,519 A | 11/1996 | Pelletier | |

(Continued)

FOREIGN PATENT DOCUMENTS

EP    1 376 387 A2    1/2004

(Continued)

OTHER PUBLICATIONS

Oliver Meyer, aTool—Creating Validated XML Documents on the Fly Using MS Word, Oct. 2002.*

(Continued)

*Primary Examiner*—Joshua D Campbell
(74) *Attorney, Agent, or Firm*—Merchant & Gould P.C.

(57) ABSTRACT

Methods and systems are provided for separating the data of a structured document from markup structure applied to the document and for linking the separately maintained data with associated markup structure applied to the document. The data stream in an Extensible Markup Language (XML) represented document is moved outside of the document structure into a data file that is linked to the document structure. The data file and the XML-represented document structure are maintained in association with a single file (e.g., document), but in separate object models. Links are established between XML elements applied to the document and data ranges of the data file. Each of the XML structure file and the data file may be accessed and edited separately without affecting the structure or data of the other file until the two files are merged for presenting the associated document.

13 Claims, 2 Drawing Sheets

U.S. PATENT DOCUMENTS

| | | | |
|---|---|---|---|
| 5,613,124 A | 3/1997 | Atkinson et al. | |
| 5,655,130 A | 8/1997 | Dodge et al. | |
| 5,675,788 A | 10/1997 | Husick et al. | |
| 5,701,342 A | 12/1997 | Anderson et al. | |
| 5,745,910 A | 4/1998 | Piersol et al. | |
| 5,752,055 A | 5/1998 | Redpath et al. | |
| 5,752,056 A | 5/1998 | Celik | |
| 5,819,295 A | 10/1998 | Nakagawa et al. | |
| 5,845,058 A | 12/1998 | Shaw et al. | |
| 5,893,109 A | 4/1999 | DeRose et al. | |
| 5,903,903 A | 5/1999 | Kennedy | |
| 5,903,905 A | 5/1999 | Andersen et al. | |
| 5,905,504 A | 5/1999 | Barkans et al. | |
| 5,911,776 A | 6/1999 | Guck | |
| 5,950,215 A | 9/1999 | Tabuchi | |
| 5,960,168 A | 9/1999 | Shaw et al. | |
| 5,993,088 A | 11/1999 | Nogay et al. | |
| 6,023,714 A * | 2/2000 | Hill et al. | 715/513 |
| 6,026,416 A | 2/2000 | Kanerva et al. | |
| 6,067,531 A | 5/2000 | Hoyt et al. | |
| 6,094,665 A | 7/2000 | Lyons et al. | |
| 6,134,552 A | 10/2000 | Fritz et al. | |
| 6,144,974 A | 11/2000 | Gartland | |
| 6,175,845 B1 | 1/2001 | Smith et al. | |
| 6,182,080 B1 | 1/2001 | Clements | |
| 6,182,096 B1 | 1/2001 | Mastie et al. | |
| 6,199,082 B1 | 3/2001 | Ferrel et al. | |
| 6,212,530 B1 | 4/2001 | Kadlec | |
| 6,247,018 B1 | 6/2001 | Rheaume | |
| 6,247,066 B1 | 6/2001 | Tanaka | |
| 6,269,403 B1 | 7/2001 | Anders et al. | |
| 6,342,904 B1 | 1/2002 | Vasudevan et al. | |
| 6,362,870 B2 | 3/2002 | Mui et al. | |
| 6,393,441 B1 | 5/2002 | Kanerva et al. | |
| 6,407,821 B1 | 6/2002 | Hohensee et al. | |
| 6,418,448 B1 | 7/2002 | Sarkar | |
| 6,449,653 B2 | 9/2002 | Klemets et al. | |
| 6,457,017 B2 | 9/2002 | Watkins et al. | |
| 6,480,206 B2 | 11/2002 | Prinzing | |
| 6,484,189 B1 | 11/2002 | Gerlach et al. | |
| 6,496,206 B1 | 12/2002 | Mernyk et al. | |
| 6,507,858 B1 | 1/2003 | Kanerva et al. | |
| 6,509,974 B1 | 1/2003 | Hansen | |
| 6,538,760 B1 | 3/2003 | deBry et al. | |
| 6,549,918 B1 | 4/2003 | Probert, Jr. et al. | |
| 6,583,789 B1 | 6/2003 | Carlson et al. | |
| 6,591,278 B1 | 7/2003 | Ernst | |
| 6,604,144 B1 | 8/2003 | Anders | |
| 6,608,693 B1 | 8/2003 | Loyd et al. | |
| 6,609,200 B2 | 8/2003 | Anderson et al. | |
| 6,654,737 B1 | 11/2003 | Nunez | |
| 6,657,647 B1 | 12/2003 | Bright | |
| 6,658,477 B1 | 12/2003 | Lisitsa et al. | |
| 6,674,540 B1 | 1/2004 | Wiechers et al. | |
| 6,675,353 B1 | 1/2004 | Friedman | |
| 6,675,356 B1 | 1/2004 | Adler et al. | |
| 6,681,223 B1 | 1/2004 | Sundaresan | |
| 6,694,485 B1 | 2/2004 | Kelley et al. | |
| 6,715,126 B1 | 3/2004 | Chang et al. | |
| 6,763,343 B1 | 7/2004 | Brooke et al. | |
| 6,771,291 B1 | 8/2004 | DiStefano, III | |
| 6,781,609 B1 | 8/2004 | Barker et al. | |
| 6,785,673 B1 | 8/2004 | Fernandez | |
| 6,789,229 B1 | 9/2004 | Dunietz et al. | |
| 6,812,941 B1 | 11/2004 | Brown et al. | |
| 6,871,321 B2 | 3/2005 | Wakayama | |
| 6,910,843 B2 | 6/2005 | Saw et al. | |
| 6,912,555 B2 | 6/2005 | Lemon et al. | |
| 6,918,082 B1 | 7/2005 | Gross et al. | |
| 6,925,597 B2 | 8/2005 | Anwar | |
| 6,925,631 B2 | 8/2005 | Golden | |
| 6,931,590 B2 | 8/2005 | Kanie et al. | |
| 6,938,203 B1 | 8/2005 | Dimarco et al. | |
| 6,941,510 B1 | 9/2005 | Ozzie et al. | |
| 6,952,801 B2 | 10/2005 | Warmus et al. | |
| 6,961,902 B2 | 11/2005 | Anecki et al. | |
| 6,981,207 B1 | 12/2005 | Bakman et al. | |
| 6,993,527 B1 | 1/2006 | Raman et al. | |
| 7,036,076 B2 | 4/2006 | Anwar | |
| 7,051,276 B1 | 5/2006 | Mogilevsky et al. | |
| 7,054,841 B1 | 5/2006 | Tenorio | |
| 7,080,083 B2 * | 7/2006 | Kim et al. | 707/100 |
| 7,134,071 B2 | 11/2006 | Ohwada et al. | |
| 7,168,035 B1 | 1/2007 | Bell et al. | |
| 7,171,618 B2 | 1/2007 | Harrington et al. | |
| 7,290,205 B2 | 10/2007 | Monocsko et al. | |
| 7,301,544 B2 | 11/2007 | Yuan | |
| 7,412,649 B2 | 8/2008 | Emek et al. | |
| 7,418,652 B2 | 8/2008 | Ornstein et al. | |
| 7,487,448 B2 | 2/2009 | Emerson et al. | |
| 7,549,118 B2 | 6/2009 | Shur et al. | |
| 2001/0003828 A1 | 6/2001 | Peterson et al. | |
| 2001/0013043 A1 | 8/2001 | Wagner | |
| 2001/0016842 A1 | 8/2001 | Umen et al. | |
| 2001/0018697 A1 | 8/2001 | Kunitake et al. | |
| 2001/0034739 A1 | 10/2001 | Anecki et al. | |
| 2001/0039552 A1 | 11/2001 | Killi et al. | |
| 2001/0044809 A1 | 11/2001 | Parasnis et al. | |
| 2001/0044813 A1 | 11/2001 | Frank | |
| 2001/0051962 A1 | 12/2001 | Piotkin | |
| 2001/0054042 A1 | 12/2001 | Watkins et al. | |
| 2002/0004805 A1 | 1/2002 | Nojima et al. | |
| 2002/0016800 A1 | 2/2002 | Spivak et al. | |
| 2002/0038348 A1 | 3/2002 | Malone et al. | |
| 2002/0049790 A1 | 4/2002 | Ricker et al. | |
| 2002/0059265 A1 | 5/2002 | Valorose | |
| 2002/0059337 A1 | 5/2002 | Takaoka et al. | |
| 2002/0065848 A1 | 5/2002 | Walker et al. | |
| 2002/0065857 A1 | 5/2002 | Michalewicz | |
| 2002/0073236 A1 | 6/2002 | Helgeson et al. | |
| 2002/0087602 A1 | 7/2002 | Masuda et al. | |
| 2002/0099797 A1 | 7/2002 | Merrell et al. | |
| 2002/0103835 A1 | 8/2002 | Kearney | |
| 2002/0107886 A1 | 8/2002 | Gentner et al. | |
| 2002/0111133 A1 | 8/2002 | Wittkotter | |
| 2002/0116421 A1 | 8/2002 | Fox et al. | |
| 2002/0120647 A1 | 8/2002 | Amano | |
| 2002/0129058 A1 | 9/2002 | Story et al. | |
| 2002/0136662 A1 | 9/2002 | Khaba | |
| 2002/0174145 A1 | 11/2002 | Duga et al. | |
| 2002/0184263 A1 | 12/2002 | Perinet et al. | |
| 2002/0188638 A1 | 12/2002 | Hamscher | |
| 2002/0194220 A1 | 12/2002 | Sluiman | |
| 2003/0004957 A1 | 1/2003 | Broman et al. | |
| 2003/0023637 A1 | 1/2003 | Halahmi | |
| 2003/0028560 A1 | 2/2003 | Kudrolli et al. | |
| 2003/0033287 A1 | 2/2003 | Shanahan et al. | |
| 2003/0065946 A1 | 4/2003 | Holliday et al. | |
| 2003/0074633 A1 | 4/2003 | Boulmakoul et al. | |
| 2003/0079181 A1 | 4/2003 | Schumacher et al. | |
| 2003/0093520 A1 | 5/2003 | Beesley | |
| 2003/0115547 A1 | 6/2003 | Ohwada et al. | |
| 2003/0120671 A1 * | 6/2003 | Kim et al. | 707/100 |
| 2003/0126136 A1 | 7/2003 | Omoigui | |
| 2003/0126260 A1 | 7/2003 | Husain et al. | |
| 2003/0137539 A1 | 7/2003 | Dees | |
| 2003/0137691 A1 | 7/2003 | Tanaka | |
| 2003/0142128 A1 | 7/2003 | Reulein et al. | |
| 2003/0145134 A1 | 7/2003 | Wehage et al. | |
| 2003/0149934 A1 | 8/2003 | Worden | 715/513 |
| 2003/0149935 A1 | 8/2003 | Takizawa et al. | 715/513 |
| 2003/0158851 A1 | 8/2003 | Britton et al. | |
| 2003/0163552 A1 | 8/2003 | Savitzky et al. | |
| 2003/0167446 A1 | 9/2003 | Thomas | 715/513 |

| | | |
|---|---|---|
| 2003/0172168 A1 | 9/2003 | Mak et al. |
| 2003/0172343 A1 | 9/2003 | Leymaster et al. |
| 2003/0177446 A1* | 9/2003 | Gropper et al. ............. 715/522 |
| 2003/0177449 A1 | 9/2003 | Rose .......................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. ........... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003343 A1* | 1/2004 | Liao et al. ................. 715/501.1 |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. ............ 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054697 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0216048 A1 | 10/2004 | Brown et al. |
| 2004/0221233 A1 | 11/2004 | Thielen |
| 2004/0226012 A1 | 11/2004 | Awada et al. |
| 2004/0230894 A1 | 11/2004 | Elza et al. |
| 2004/0243551 A1 | 12/2004 | Boone et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ......................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0025091 A1 | 2/2006 | Buford |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136809 A1 | 6/2006 | Fermstrom |
| 2006/0155529 A1 | 7/2006 | Ludviksson et al. |
| 2006/0168562 A1 | 7/2006 | Emek et al. |
| 2006/0206794 A1 | 9/2006 | Ornstein et al. |
| 2006/0227150 A1 | 10/2006 | Yuan |
| 2007/0061384 A1 | 3/2007 | Harrington et al. |
| 2007/0136443 A1 | 6/2007 | Sah et al. |

FOREIGN PATENT DOCUMENTS

| | | |
|---|---|---|
| EP | 1 452 966 A2 | 11/2004 |
| EP | 1 672 543 A28 | 11/2005 |
| EP | 1 672 528 A2 | 12/2005 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | WO 2006/021673 | 6/2006 |
| WO | WO 2006/133053 A2 | 12/2006 |
| ZA | 2005/09350 | 4/2008 |

OTHER PUBLICATIONS

Ray Whitmer, Document Object Model (DOM) Level 3 XPath Specification, Feb. 26, 2004, W3C, Version 1.0.*

Halvorson et al., "Microsoft OfficeXP Inside Out, 2001," Microsoft Press, pp. 272, 273, and 289.*

U.S. Appl. No. 11/072,188, filed Mar. 4, 2005 entitled "Method and Apparatus for Utilizing an Object Model to Manage Document Parts for Use in an Electronic Document".

U.S. Appl. No. 11/072,659, filed Mar. 4, 2005 entitled "Method and Apparatus for Utilizing an Extensible Markup Language Schema to Defined Document Parts for Use in an Electronic Document".

U.S. Appl. No. 11/125,907, filed May 10, 2005 entitled "Structuring an Electronic Document for Efficient Identification and Use of Document Parts".

U.S. Appl. No. 11/398,339, filed Apr. 5, 2006 entitled "Structuring Data for Word Processing Documents".

U.S. Appl. No. 11/445,903, filed Jun. 2, 2006 entitled "Structuring Data for Presentation Documents".

U.S. Appl. No. 11/431,931, filed May 10, 2006 entitled "Exposing Embedded Data in a Computer-Generated Document".

U.S. Appl. No. 11/389,367, filed Mar. 24, 2006 entitled "Structuring Data for Spreadsheet Application Documents".

U.S. Appl. No. 10/731,900, filed Dec. 9, 2003 entitled "Context Free Document Portions".
U.S. Appl. No. 10/955,622, filed Sep. 30, 2004 entitled "Method, System, and Computer-Readable Medium for Creating, Inserting and Reusing Document Parts in an Electronic Document".
U.S. Appl. No. 11/019,088, filed Dec. 20, 2004 entitled "Management and Use of Data in a Computer-Generated Document".
U.S. Appl. No. 11/018,718, filed Dec. 20, 2004 entitled "File Formats, Methods, and Computer Program Products for Representing Documents".
U.S. Appl. No. 11/018,910, filed Dec. 20, 2004 entitled "File Formats, Methods, and Computer Program Products for Representing Presentations".
U.S. Appl. No. 11/019,095, filed Dec. 21, 2004 entitled "Method and System for Exposing Nested Data in a Computer-Generated Document in a Transparent Manner".
U.S. Appl. No. 11/018,912, filed Dec. 20, 2004 entitled "File Formats, Methods, and Computer Program Products for Representing Workbooks".
U.S. Appl. No. 11/018,405, filed Dec. 20, 2004 entitled "Context-Free Document Portions with Alternate Formats".
U.S. Official Action mailed May 12, 2006 in U.S. Appl. No. 10/731,900.
European Search Report dated Dec. 19, 2007 in Application No. EP 05 111375.1-1527, 8 pages.
U.S. Official Action dated Mar. 7, 2007 in U.S. Appl. No. 11/018,912.
"@try inCSS3 (was: Useragent Rules in CSS)", http://lists.w3.org/Archives/Public/www-style/2004Mar/0333.html, 2 pages (Mar. 31, 2004).
"Apache Server Frequently Asked Questions", Apache HTTP Server Version 1.3, http://httpd.apache.org/docs/1.3/misc/FAQ.html; 43 pages.
"Controlling the Data Chaos by Adding Intelligence to Media", 4 pages (2004).
"Networked File System", http://www.scit.wlv.ac.uk/~jphb/comms/nfs.htm; 7 pages.
"Open eBook Publication Structure 1.2", http://www.idpf.org/oebps/oebps1.2/download/oeb12-xhtml.htm, 71 pages (Aug. 27, 2002).
Anonymous: "Technical note TN2073: Deconstructing A Keynote 1.x Document: Part One—Slides," Online Publication, May 20, 2003, XP002404031, Retrieved from the Internet: URL:http:///developer.apple.com/technotes/tn2002/pdf/tn2073.pdf on Oct. 20, 2006, 27 pp.
Anonymous: "Technical Note 2067: About the Keynote XML File Format (APXL Schema)," Online Publication, Feb. 12, 2003, XP002404032; Retrieved from the Internet: URL:http:///developer.apple.com/technotes/tn2002/pdf/tn2067.pdf on Oct. 20, 2006, 26 pp.
Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006, 17 pp.
Bauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006, 607 pp.
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).
El-Kwae et al., "Document Image Representation Using XML Technologies", Proceedings of SPIE, vol. 4670, pp. 109-120 (2002).
Ellis, "Postscrip, Bezier Curves and Chinese Characters", ACM, pp. 162-165 (1989).
Girardot et al., "Efficient Representation and Streaming of XML Content Over the Internet Medium", IEEE, pp. 67-70 (2000).
Han et al., "WebSplitter: A Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pages.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Microsoft Word, (hereinafter Word), pp. 1-4 (Copyright 2001).
Miller, "An Introduction to the Resource Description Framework", D-Lib Magazine, ISSN 1082-9873, http://www.dlib.org/dlib/may98/miller/05miller.html, 10 pages (May 1998).
Obsanjo, "Designing Extensible, Versionable XML Formats", Google Jul. 21, 2004, http://www.xml.com/pub/a/2004/07/21/design.html, 17 pages.
Obsanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pages.
Obsanjo, Designing XML Formats: Versioning vs. Extensibility, Google Apr. 11, 2004, blods.msdn.com/dareobasanjo/archive/2004/04/11/111369.aspx, 3 pages.
Office Action Correspondence Subsystem, version 1.3 (herein after OACS), copyright Feb. 2003, pp. 1-2 to 1-123, 2-2 to 2-122 and 3-2 to 3-44.
OpenOffice.org, "OpenOffice.org User Guide for Version 1.1x: Chapter 4: Spreadsheets in Calc", published May 7, 2004, pp. 1, 2, 179-254, http://documentation.openoffice.org/manual/OOO1.x.x/user_guide.pdf.
OpenOffice.org, "OpenOffice.org User Guide for Version 1.1x: Chapter 5: Creating Presentations With Impress", published May 7, 2004, pp. 1, 2, 255-286, http://documentation.openoffice.org/manuals/OOO1.x.x/user_guide.pdf.
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003, 12 pages.
Pawson, "Printing from XML: An Introduction to XSL-FO,", Google Oct. 9, 2002, http://www.xml.com/pub/a/2002/10/09/xslfo.html, 6 pages.
Peters et al., "CrystalWeb-A Distributed Authoring Environment for the World-Wide Web," Computer Networks and ISDN Systems, vol. 27, No. 6, pp. 861-870 (Apr. 1995).
ReplyAssistant, pp. 1-34 (Copyright 2001).
Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Steele, "Easy Microsoft Office Word 2003", published Sep. 19, 2003, Que Corporation, pp. 52, 53 and 216 (6 total pages).
Uknown, ReplyAssistant Version 1.1, downloaded form <http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pages.
van Leeuwen et al., "XML for Flexibility and Extensibility of Design Information Models", Proceedings of CAADRIA, University of Sydney, Australia, pp. 491-502 (2001).
U.S. Office Action mailed Feb. 28, 2007 in U.S. Appl. No. 10/731,900.
U.S. Office Action mailed Aug. 9, 2007 in U.S. Appl. No. 10/731,900.
U.S. Office Action mailed Sep. 20, 2005 in U.S. Appl. No. 10/836,326.
U.S. Office Action mailed May 31, 2006 in U.S. Appl. No. 10/836,326.
U.S. Office Action mailed Oct. 20, 2006 in U.S. Appl. No. 10/836,326.
U.S. Office Action mailed Apr. 9, 2007 in U.S. Appl. No. 10/836,326.
U.S. Office Action mailed Jul. 26, 2007 in U.S. Appl. No. 10/836,326.
U.S. Office Action mailed Feb. 22, 2008 in U.S. Appl. No. 10/836,327.
U.S. Office Action mailed Jun. 28, 2006 in U.S. Appl. No. 10/836,608.
U.S. Office Action mailed Dec. 12, 2006 in U.S. Appl. No. 10/836,608.

U.S. Office Action mailed Mar. 8, 2007 in U.S. Appl. No. 10/836,608.
U.S. Office Action mailed Jul. 27, 2007 in U.S. Appl. No. 10/836,608.
U.S. Office Action mailed Jan. 24, 2005 in U.S. Appl. No. 10/837,040.
U.S. Office Action mailed Jul. 15, 2005 in U.S. Appl. No. 10/837,040.
U.S. Office Action mailed Oct. 18, 2005 in U.S. Appl. No. 10/837,040.
U.S. Office Action mailed Apr. 6, 2006 in U.S. Appl. No. 10/837,040.
U.S. Office Action mailed Sep. 29, 2006 in U.S. Appl. No. 10/837,040.
U.S. Office Action mailed Dec. 19, 2006 in U.S. Appl. No. 10/837,040.
U.S. Office Action mailed May 15, 2007 in U.S. Appl. No. 10/837,040.
U.S. Office Action mailed Jun. 14, 2007 in U.S. Appl. No. 10/955,622.
U.S. Office Action mailed Mar. 17, 2008 in U.S. Appl. No. 10/955,622.
U.S. Office Action mailed Aug. 2, 2007 in U.S. Appl. No. 11/018,405.
U.S. Office Action mailed Jun. 19, 2007 in U.S. Appl. No. 11/018,718.
U.S. Office Action mailed Mar. 21, 2007 in U.S. Appl. No. 11/018,910.
U.S. Office Action mailed Oct. 3, 2007 in U.S. Appl. No. 11/018,910.
U.S. Office Action mailed Oct. 1, 2007 in U.S. Appl. No. 11/018,912.
U.S. Office Action mailed Mar. 21, 2007 in U.S. Appl. No. 11/019,088.
U.S. Office Action mailed May 8, 2007 in U.S. Appl. No. 11/072,188.
U.S. Office Action mailed Dec. 28, 2007 in U.S. Appl. No. 11/072,188.
U.S. Office Action mailed Sep. 17, 2007 in U.S. Appl. No. 11/072,659.
U.S. Office Action mailed Feb. 4, 2008 in U.S. Appl. No. 11/125,907.
U.S. Office Action mailed Aug. 29, 2006 in U.S. Appl. No. 11/222,344.
U.S. Office Action mailed Feb. 22, 2007 in U.S. Appl. No. 11/222,344.
U.S. Office Action mailed Aug. 1, 2007 in U.S. Appl. No. 11/222,344.
U.S. Office Action mailed Oct. 3, 2006 in U.S. Appl. No. 11/222,442.
U.S. Office Action mailed Feb. 20, 2007 in U.S. Appl. No. 11/222,442.
U.S. Office Action mailed Jul. 10, 2007 in U.S. Appl. No. 11/222,442.
U.S. Office Action mailed Jun. 18, 2007 in U.S. Appl. No. 11/398,339.
U.S. Office Action mailed Mar. 25, 2008 in U.S. Appl. No. 11/398,339.
European Search Report dated Nov. 3, 2006 in EP 05111509.5.
European Search Report dated Dec. 19, 2007 in EP 05111677.0.
European Search Report dated Dec. 19, 2007 in EP 05111375.1.
European Search Report dated Dec. 19, 2007 in EP 05112123.4.
European Examination Report dated Mar. 3, 2008 in EP 05111375.1.
U.S. Official Action mailed May 14, 2008 in U.S. Appl. No. 10/731,900.
U.S. Official Action mailed Jun. 26, 2008 in U.S. Appl. No. 11/072,659.
U.S. Official Action mailed Jul. 9, 2008 in U.S. Appl. No. 11/019,088.
"Introduction to SpreadsheetML", Online Helpfile 'OFFICEXMLSDK.CHM' extracted from 'OFFICE2003XMLSCHEMA.EXE', Dec. 5, 2003 http://www.microsoft.com/downloads/details.aspx?familyid=fe118952-3547-420a-a412-00a2662442d9&displaying=en, retrieved on Apr. 10, 2008, 58 pp.
"Comparative Assessment of Open Documents Formats Market Overview - Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
U.S. Official Action mailed Oct. 18, 2005 in U.S. Appl. No. 10/837,040 ( ), pgs.
U.S. Official Action mailed Mar. 25, 2008 in U.S. Appl. No. 11/398,339 (14917.0184USI1), pgs.
U.S. Official Action mailed Jul. 22, 2008 in U.S. Appl. No. 11/072,188 (14917.0065USI1), pgs.
U.S. Official Action mailed Oct. 30, 2008 in U.S. Appl. No. 11/125,907 (1491 7.0084US01), pgs.
U.S. Official Action mailed Nov. 14, 2008 in U.S. Appl. No. 11/072,659 (1491 7.0066US11), pgs.
European Search Report dated Nov. 30, 2007 in EP 05105111.8 (60001.0421EP01), pgs.
European Examination Report dated Mar. 14, 2008 in EP 05105111.8 (60001.0421EP01), pgs.
European Examination Report dated Mar. 26, 2008 in EP 05111677.0 (60001.0441EP01), pgs.
European Search Report dated Apr. 22, 2008 in EP 05111549.1 (60001.0447EP01), pgs.
PCT Search Report dated Jun. 25, 2008 in PCT/US2006/21673 (14917.0187USU1), pgs.
Chinese Office Action dated Jul. 18, 2008, in 200510126789.6 (60001.0443CC01), pgs.
European Communication dated Jul. 22, 2008 in EP 05111549.1 (60001.0447EP01), pgs.
Chinese Office Action dated Aug. 1, 2008 in 200510126792.8 (60001.0440CC01), pgs.
Chinese Office Action dated Aug. 1, 2008 in 200510126798.5 (60001.0446CC01), pgs.
Chinese Office Action dated Aug. 22, 2008 in 200510125059.04 (60001.0441CC01), pgs.
Chinese Office Action dated Oct. 31, 2008 in 200510125058.X (60001.0447CC01), pgs.
Orchard et al. "[Editorial Draft] Versioning XML Languages W3C Proposed TAG Finding", http://www.w3.org/2001/tag/doc/versioning-20031116, Nov. 16, 2003, pp. 1-23.
Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.
U.S. Official Action mailed Dec. 17, 2008 in U.S. Appl. No. 11/019,088.
U.S. Official Action mailed Jan. 23, 2009 in U.S. Appl. No. 11/389,367.
U.S. Official Action mailed Feb. 4, 2009 in U.S. Appl. No. 11/445,903.
European Search Report dated Dec. 15, 2008 in EP 05111511.1.
Chinese First Office Action dated Jan. 9, 2009 in 200510127115.8.
Chinese Second Office Action dated Jan. 16, 2009 in 200510125062.6.
Chinese Second Office Action dated Feb. 6, 2009 in 200510126789.6.
Chinese First Office Action dated Feb. 6, 2009 in 200510088462.4.
European Communication dated Mar. 12, 2009 in EP 05111375.1.
Jones, B., "Word XML's Context Free Chunks: Building a Document from Multiple Pieces of Content", http://blogs.msdn.com/brian jones_archive/2005/07/20/441167.aspx, Jul. 20, 2005, 4 pp.
Carrano, "Data Abstraction and Problem Solving with C++", copyright 1995, pp. 14-16.
U.S. Official Action mailed Apr. 16, 2009 in U.S. Appl. No. 11/072,188 (14917.0065USI1).
PCT Search Report dated Jul. 3, 2007 in PCT/US2006/21825 (14917.0184).
European Communication dated Mar. 26, 2008 in EP 05112123.4 (60001.0446EP01).
Chinese Office Action dated Aug. 1, 2008 in 200510125062.6 (60001.0442CC01).
Chinese Second Office Action dated Mar. 6, 2009 in 200510126798.5 (60001.0446CC01).
European Search Report dated Mar. 11, 2009 in EP 05111550.9 (60001.0453EPI1).
Adobe Creative Team, "Adobe Acrobat 5.0 Classroom in a Book", published Jun. 26, 2001, Adobe Press, pp. 1-26+cover page (27 pp.).
European Communication dated Jul. 10, 2009 in EP 05111511.1-1527 (60001.0440EP01), pp. 1-5.

Proydakov, E.M., "English-Russian Explanatory Dictionary in Computing Engineering, Internet, and Programming", Moscow: publishing house "Russian edition", 2001, pp. 1-3.

Gudgin, M., "SOAP Version 1.2 Part 1: Messaging Framework", W3C Candidate Recommendation (Dec. 19, 2002), pp. 1-65.

Chinese Second Office Action dated Jun. 5, 2009 in 200480001312.9, pp. 1-9.

Chinese Third Office Action dated Jul. 17, 2009 in 200480001395.01, pp. 1-7.

Chinese Second Office Action dated Mar. 13, 2009 in 200480001395.1 (308874.04), pp. 1-7.

Chinese Second Office Action dated Mar. 27, 2009 in 20040001339.08 (304846.04), pp. 1-7.

Chinese Decision on Rejection dated Mar. 27, 2009 in 200480001336.4 (308877.04), pp. 1-17.

Chinese Decision on Rejection dated May 8, 2009 in 200510125059.04 (60001.0441CC01), pp. 1-14.

Chinese Third Office Action dated Jun. 5, 2009 in 200510126789.6 (60001.0443CC01), pp. 1-7.

Russian Official Action dated Jan. 13, 2008 in 2412-139543RU/8132 (304698.10), pp. 1-9.

* cited by examiner

METHOD AND SYSTEM FOR LINKING DATA RANGES OF A COMPUTER-GENERATED DOCUMENT WITH ASSOCIATED EXTENSIBLE MARKUP LANGUAGE ELEMENTS

FIELD OF THE INVENTION

The present invention generally relates to managing data in computer-generated documents. More particularly, the present invention relates to methods and systems for linking data ranges of a data file with associated Extensible Markup Language elements of a computer-generated document.

BACKGROUND OF THE INVENTION

With the advent of the computer age, computer and software users have grown accustomed to user-friendly software applications that help then write, calculate, organize, prepare presentations, send and receive electronic mail, make music, and the like. For example, modem electronic word processing applications allow users to prepare a variety of useful documents. Modem spreadsheet applications allow users to enter, manipulate, and organize data. Modem electronic slide presentation applications allow users to create a variety of slide presentations containing text, pictures, data or other useful objects.

Computer-generated documents, for example, word processing documents, may be structured and formatted according to a markup language such as the Extensible Markup Language (XML). Applying XML structure to such documents, or representing the entire document as an XML file, provides many advantages. For example, a given text or data range in a template document may be structured for containing data of a certain type (e.g., date, heading, conclusion, summary, etc.). Additionally, by representing the entire document as XML, all the application information used to create that document is available in a text format for external sources to parse/edit. Subsequently, a consuming application may readily parse the document to obtain and use either the desired text, formatting information, structural information, or even just the data from the document according to the structure of the actual persistent XML saved out with the document.

Unfortunately, editing behaviors of such structured documents are often fragile because the documents are limited by the fact that the positioning of XML tags (markup) on the document surface determines the structure of the XML instance document in an associated user-defined schema file. Problems often arise from common user operations (e.g., copy/paste from one section of a document to another section) may corrupt the XML structure applied to the document. Additionally, all elements from a user-defined schema file must be included in some form on the document surface. This makes it impossible to choose only a subset of the data to present to the user for editing while maintaining the rest for other uses (workflow; searching; management; etc.). Other problems include an inability for solution creators to use a schema file as a method for carrying true metadata about the document. Moreover, elements that are semantically unnecessary on the document surface (e.g., non-leaf elements which are not marking up mixed content) must be included which further increase the fragility associated with common user operations. The final difficulty for a solution creator is that in order to deal with the data they care about, they must also navigate through all the application specific markup that is not as interesting to them. They must also make sure that when editing values of their own custom data, they also need to maintain the proper application markup.

It is with respect to these and other considerations that the present invention has been made.

SUMMARY OF THE INVENTION

Embodiments of the present invention solve the above and other problems by providing methods and systems for separating the custom data of a structured document from application markup structure applied for the actual representation of the document and for linking the separately maintained data with associated markup structure applied to the document. According to embodiments of the present invention, the data stream in an Extensible Markup Language (XML) represented document is moved outside of the document structure into a data file that is linked to the document structure. The data file and the XML-represented document structure are maintained in association with a single file (e.g., document), but in separate parallel object models.

Links are established between XML elements applied to the document and data ranges of the data file. Accordingly, a document author/editor may markup the document with XML structure that is linked to data that is associated with structural elements of the document. An end user of the document may access the XML structure of the document for editing the XML structure of the document without corrupting the data of the file. Likewise, an end user may access the separately maintained data file to edit data without corrupting the XML structure of the document. When the document is opened, the XML structure and the associated data are merged for presentation to a user such that the data is presented in the document according to the structure applied to the document. This allows for solutions to be built against the custom data without the need to understand any of the application specific markup (as they are kept separate). This is true when editing the data while the file is loaded in the application, as well as when the file is saved and the solution is acting on the file itself.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for separating the data of a structured document from the markup structure applied to the document. The separately maintained data is linked with associated markup structure applied to the document. Accordingly, an end user of the document may access the structure of the document for editing the structure without corrupting the data of the file. Likewise, an end user may access the separately maintained data file to edit data without corrupting the structure of the document. When the document is opened, the structure and the associated data are merged for presentation to a user such that the data is presented in the document according to the structure applied to the document. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
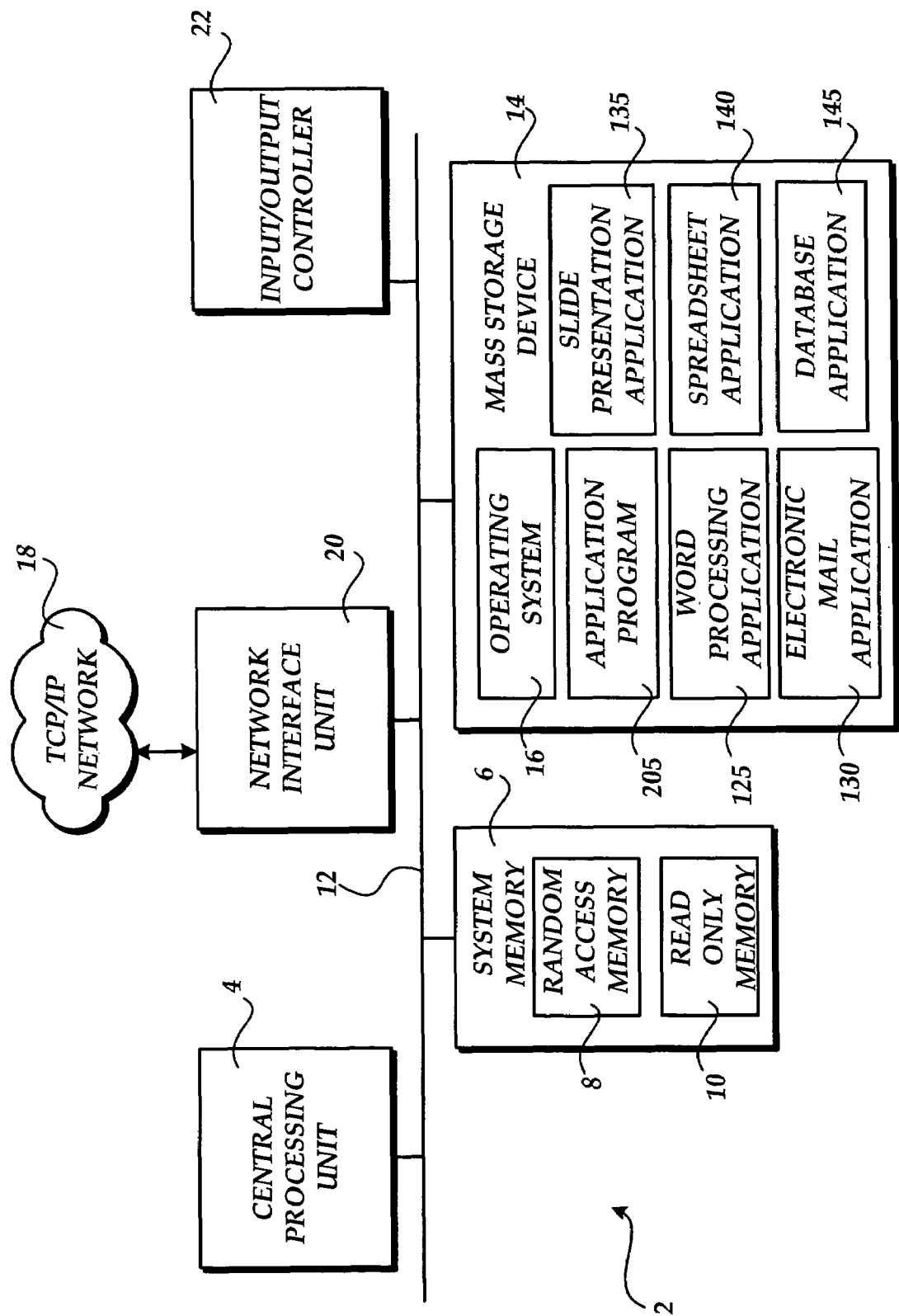
FIG. 1 illustrates an exemplary computing operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 205 for providing a variety of functionalities to a user. For instance, the application program 205 may comprise many types of programs such as a word processing application, a spreadsheet application, a desktop publishing application, and the like. According to an embodiment of the present invention, the application program 205 comprises a multiple functionality software application suite for providing functionality from a number of different software applications. Some of the individual program modules that may comprise the multiple application suite 205 include a word processing application 125, a slide presentation application 135, a spreadsheet application 140 and a database application 145. An example of such a multiple functionality application suite 205 is OFFICE manufactured by Microsoft Corporation. Other software applications illustrated in FIG. 1 include an electronic mail application 130.

Figure 2:
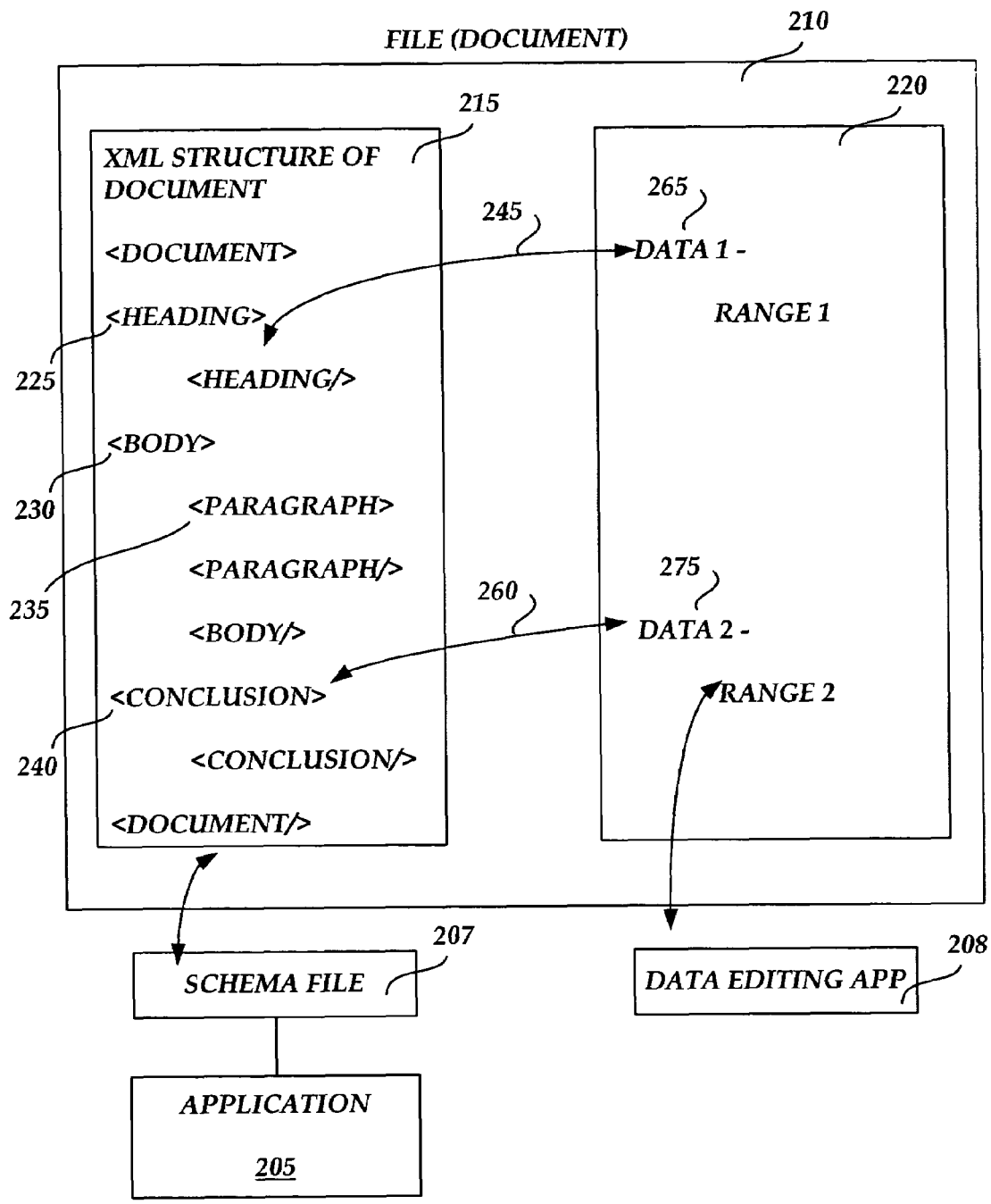
FIG. 2 illustrates a computer-generated document comprising an Extensible Markup Language structure file and an associated data file according to embodiments of the present invention.

FIG. 2 illustrates a computer-generated document comprising an Extensible Markup Language structure file and an associated data file according to embodiments of the present invention. Referring to FIG. 2, a computer-generated file 210 is illustrated, which is generated and/or edited by an application 205. As described above, the application 205 may be a single software application, such as a word processing application, a spreadsheet application, a slide presentation application, and the like. Or, the application 205 may represent a multiple application suite which includes multiple applications, for example, a word processing application, a spreadsheet application, a slide presentation application, and the like.

The file or document 210, for example, a word processing document, such as an article or memorandum, is comprised of two parallel, but separate, files 215, 220. According to embodiments of the present invention, XML structure applied to the file 210 according to an associated XML schema file 207 is stored in the XML structure file 215 under a document object model established for the XML structure file. For example, referring to the XML structure file 215, a first XML structural element 225 is applied to the structure file for an example heading section of the document 210. A second XML structural element 230 is applied to the XML structure file 215 for an example body section of the document. A third XML structural element 240 is applied to the XML structure file 215 for an example conclusion section of the document 210.

The schema file 207 is illustrative of an XML file associated with the file 210 for defining the XML structure applied to the file 210. For example, the schema file 207 may be used for defining the names and definitions of each of the XML elements 225, 230, 240 applied to the XML structure file 215. Similarly, the schema file 207 may be used for defining the data types and data properties that may be entered into the associated data file 220 for populating the overall file 210 according to the XML structure applied to the file 210 in the XML structure file 215.

According to embodiments of the present invention, rather than entering data for each of the structured sections of the file 210 into a single document along with the associated XML structure, the data for the file 210 is maintained in a separate data file 220 established under a separate, but parallel, document object model. As illustrated in FIG. 2, the example data file 220 contains a first data range 265 associated with the XML element 225 in the XML structure file 215. A second data range 275 is associated with both the XML element 240. Links may be written between a single data range in the data file 220 and more than one associated XML structural element in the XML structure file 215. According to embodiments of the invention, all XML structural elements do not point to or are not linked to corresponding data ranges. Referring to FIG. 2, for example, the <body> element 230 and the <paragraph> element 235 are not linked to data ranges in the data file 220. Those elements may have been applied to the document for presentation and layout. Also, it may be that data supplied to the linked data ranges may come from a third party, but data for the <body> and <paragraph> sections may come from the document editor, and there may be no need to link those elements to a data source.

Each XML element in the XML structure file 215 is linked to an associated data range in the data file 220 via a data link. According to one implementation, the data link is an XPath. As is known to those skilled in the art, the XPath provides a means for linking an XML structural element in the XML file 215 with corresponding data ranges in the data file 220. According to an embodiment, the mapping between portions of the document and associated data ranges is not a direct mapping between an XML element and an associated data range as illustrated in FIG. 2. Instead, the mapping is between a "data binding" tag in the document that is associated with a desired portion of the document, and the "data binding" tag has an XPath as a value. As should be understood by those skilled in the art, other suitable means may be utilized for establishing a data link between a given XML structural element in the XML structure file with corresponding data ranges in the associated data file 220. For a detailed discussion of linking structured portions of a document to associated data ranges in a data file or database, see U.S. patent application Ser. No. 10/164,260 filed Jun. 5, 2002, entitled "Mechanism for Downloading Software Components from a Remote Source for Use by a Local Software Application", which is incorporated herein by reference as if fully set out herein, and U.S. patent application Ser. No. 10/366,141, filed Feb. 13, 2003, entitled "Linking Elements of a Document to Corresponding Fields, Queries and/or Procedures in a Database", which is incorporated herein by reference as if fully set out herein.

According to embodiments of the present invention, the document 210 serves as a container for the XML structure file 215 and the associated data file 220. As should be understood by those skilled in the art, the XML structure file 215 and the associated data file 220 may be maintained in a common memory location on the hard drive of a local computing device, or on a volatile memory source such as a floppy disk or CD. Alternatively, the XML structure file 215 and the associated data file 220 may be stored in different locations and may be linked to each other via a distributed computing network. For example, the data file 220 may be stored on a computer server located a distance from the separately stored XML structure file 215, and the link between given XML structure elements in the XML structure file 215 and associated data ranges in the data file 220 may be across a distributed computing network such as a local or wide area intranet or the Internet.

Referring still to FIG. 2, when the file 210 is opened via the application 205, the file may be opened as a single document showing data from the data file 220 presented in the document structured according to the XML structure file 215. For example, opening the file 210 may result in the display of a single document having a heading with heading data from the data range 265, having a body with body data from the data range 270 and having a conclusion including conclusion data from the data range 275. When the file 210 is thus opened, the separate XML structure file 215 and the associated data file 220 are synchronized to form and display the single document having the data from the data file 220 formatted and structured according to the XML elements applied to the document via the XML structure file 215.

Alternatively, if it is desired by an author or editor of the file 210 to affect editing changes, additions or deletions to the XML elements applied to the document via the XML structure file 215, the XML structure file 215 may be opened as a separate file without population of the XML structure with data from the associated data file 220. Thus, the author and/or editor may make XML structural or formatting changes to the XML structure file without being encumbered by the inclusion of data associated with any of the XML elements. For example, an author/editor of the file 210 may decide to add a new section to the example document illustrated at FIG. 2. For example, the author/editor may decide to add a "summary" section to the file 210. For adding the summary section, the author/editor may add XML tags associated with a summary section to the XML structure file 215. After the XML structure is added to the XML structure file 215, a link is established between the new XML element(s) with an associated data range in the associated data file 220 if it is desired that data from a data range be associated with the new XML structure. That is, as described above, it is not necessary that all portions of the document be linked to associated data ranges. Some markup may be applied for presentation or formatting only.

According to embodiments of the present invention, an author/editor of the file 210 may similarly open the data file 220 separate from the XML structure file 215 for editing individual data ranges contained in the data file 220. For example, if the author/editor of the file 210 desires to edit the conclusion of the example word processing document/file 210, the author/editor may open the data file 220 and make changes to the data contained in the data range 275 illustrated in FIG. 2. Once one or more data ranges in the data file 220 are edited, the data file 220 may be saved without affecting any of the structural markup applied to the XML structure file 215. Subsequently, when the file 210 is opened by the application 205, the edited data applied to the data file 220, as described above, is displayed in the file 210 according to the associated XML structure linked to the edited data from the XML structure file 215.

According to embodiments of the present invention, a data editing application 208 may be utilized by an author/editor of the file 210 or by third parties for accessing the data file 220 and for editing data ranges contained in the data file 220. That is, the third party data editing application 208 may be a separate application from the application 205 with which the file 210 is created and/or edited. This is particularly advantageous for allowing third parties to prepare programs for running against the data file 220 on a periodic or automated basis. For example, a third-party accounting firm may be hired by a sales company to tabulate sales figures on a periodic basis. The third-party accounting firm may, on a periodic basis, open the data file 220 using a third-party data editing application 208 for automatically updating a data range contained in the data file associated with sales figures. Accordingly, when a sales manager subsequently opens the file 210 with the application 205, the opened file 210 will show the updated sales figures applied to the data file 220, but shown according to the XML structure applied to the file by the XML structure file 215.

Advantageously, the third-party accounting firm, in this example, is able to affect data changes without the potential of changing or harming XML structure applied to the document via the XML structure file 215. Indeed, the third party does not need to know anything about the XML structure applied to the document. The third party can be completely ignorant of how the document will be structured so that the third party is only responsible for its own custom data that is populated into a data range for access by the document. In addition, for security purposes, it may be desired that the third-party accounting firm, in this example, may only access certain data ranges in the data file 220 because other data ranges in the data file may contain information that is confidential and that should not be accessible by the third-party accounting firm. According to embodiments of the present invention, the third-party accounting firm may make changes directly to the one or more data ranges to which it has access for updating the overall file 210 without having access to other data ranges in the data file 220 and without having access to the XML structure applied to the file 210 by the author/editor or owner of the file 210.

According to embodiments of the present invention, as data is changed in the file 210, live updates may be made to a corresponding data range contained in the data file 220. For example, if changes are made to data associated with the heading section 225, the application 205 may pass the data changes along the link 245 to the data range 265 for automatically changing the data contained in the data range 265. Alternatively, the changes made to data in the file 210 may be temporarily stored in a temporary data file that parallels the data file 220. Then, if the author/editor of the file 210 saves the file 210, the changes made to a section of the file 210 may be passed along the corresponding link to the data range in the data file 220 for persisting those changes in the data file 220.

Similarly, if an author/editor of the file 210 makes changes to the file 210 in a given section of the file 210 associated with XML structure and corresponding data ranges, the author/editor may choose to "undo" the changes made to the data. According to one embodiment, if the changes made to the data are automatically persisted to associated data ranges in the data file 220, the application 205 may send data associated with the edited data range across an appropriate data link to the affected data range for replacing the data to a state prior to the change in the data by the author/editor. According to an alternate embodiment, if changes made to given sections of the file 210 are stored in a temporary data file until the file 210 is saved, an undo operation may be made by passing data to the temporary data file for restoring the affected data range in the temporary data file to a state of the data prior to the change made by the author/editor.

As briefly described herein, methods and systems are provided for separating markup structure applied to a document from corresponding data entered into the document to allow separate editing of the markup structure and associated data. Linking markup structure elements of the document with associated data ranges in a separate data file allow for the presentation of a merged document showing the entered data structured according to the applied markup elements. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for managing markup structure and associated data in a computer-generated document, comprising:
    applying Extensible Markup Language (XML) elements to a document;
    generating an XML structure file for containing the XML elements applied to the document;
    generating an associated data file for storing data entered into the document;
    establishing a link from a plurality of the XML elements contained in the XML structure file with a corresponding data range contained in the associated data file, wherein the link is established by a mapping between a data binding tag in the document that is associated with a desired portion of the document, wherein the data binding tag has an XPath as a value;
    upon launching the document, merging data contained in the data file with linked XML elements contained in the XML structure file for displaying the data contained in the data file in the document according to the XML elements applied to the document;
    displaying the document on a display device;
    receiving edits to a given data item displayed in the document, wherein the edits are received from a third-party data editing application which is separate from an application utilized for creating and editing the data file, wherein the third-party data application has access to only a certain number of a plurality of associated data ranges in the data file for making the edits, wherein the third-party data application does not have access to associated data ranges in the plurality of associated data ranges in the data file which do not comprise the certain number, and wherein the third-party data application does not have access to the XML elements applied to the documents which are contained in the XML structure file;
    passing the edits to the given data item to the data file for automatically persisting in one of the plurality of associated data ranges in the data file, wherein automatically persisting comprises initiating a live update to the one of the plurality of associated data ranges in the data file, the live update comprising automatically changing the data in the one of the plurality of associated data ranges in the data file, the changed data comprising data associated with a section of the data file; and
    sending data associated with the edited associated data range across a data link to the associated data range to replace the data in the one of the plurality of associated data ranges to a state prior to the edits being received for the given data item displayed in the document.

2. The method of claim 1, further comprising providing an electronic file container for containing the XML structure file and the data file.

3. The method of claim 2, whereby upon selection of the electronic file container, providing access to each of the XML structure file and the data file.

4. The method of claim 2, further comprising:
allowing access to the XML structure file independent of the data file for editing the XML elements applied to the document; and
allowing access to the data file independent of the XML structure file for editing data contained in the data file.

5. A method for managing markup structure and associated data in a computer-generated document, comprising:
receiving an application of Extensible Markup Language (XML) elements to a document;
receiving an input of data into the document;
generating an XML structure file for containing the XML elements applied to the document;
generating a data file for storing data entered into the document;
separating the XML structure file and the data file into two separate files contained in an electronic container file;
establishing a link from a plurality of the XML elements contained in the XML structure file to a corresponding data range in the data file, wherein at least one of the XML elements is a non-linked element with respect to the stored data in the data file, the at least one non-linked element being applied for presentation and layout of the document;
upon launching the document, merging data contained in the data file with linked XML elements contained in the XML structure file for displaying the data contained in the data file in the document according to a document structure dictated by the XML elements applied to the document;
displaying the document on a display device;
receiving edits to a given data item displayed in the document, wherein the edits are received from a third-party data editing application which is separate from an application utilized for creating and editing the data file, wherein the third-party data application has access to only a certain number of a plurality of associated data ranges in the data file for making the edits, wherein the third-party data application does not have access to associated data ranges in the plurality of associated data ranges in the data file which do not comprise the certain number, and wherein the third-party data application does not have access to the XML elements applied to the documents which are contained in the XML structure file;
storing the edits to the given data item in a temporary data file until the data file is saved; and
passing data to the temporary data file for restoring an affected data range in the temporary data file to a data state prior to the edits being received for the given data item displayed in the document.

6. The method of claim 5, whereby upon selection of the electronic file container, providing access to each of the XML structure file and the data file.

7. The method of claim 6, further comprising:
allowing access to the XML structure file independent of the data file for editing the XML elements applied to the document; and
allowing access to the data file independent of the XML structure file for editing data contained in the data file.

8. A computer-readable storage medium having stored thereon computer-executable instructions which when executed by a computer perform a method for managing markup structure and associated data in a computer-generated document, comprising:
applying Extensible Markup Language (XML) elements to a document;
generating an XML structure file for containing the XML elements applied to the document;
generating an associated data file for storing data entered into the document;
establishing a link from a plurality of the XML elements contained in the XML structure file with a corresponding data range contained in the associated data file, wherein the link is established by a mapping between a data binding tag in the document that is associated with a desired portion of the document, wherein the data binding tag has an XPath as a value; and
upon launching the document, merging data contained in the data file with linked XML elements contained in the XML structure file for displaying the data contained in the data file in the document according to the XML elements applied to the document;
receiving edits to a given data item displayed in the document, wherein the edits are received from a third-party data editing application which is separate from an application utilized for creating and editing the data file, wherein the third-party data application has access to only a certain number of a plurality of associated data ranges in the data file for making the edits, wherein the third-party data application does not have access to associated data ranges in the plurality of associated data ranges in the data file which do not comprise the certain number, and wherein the third-party data application does not have access to the XML elements applied to the documents which are contained in the XML structure file;
passing the edits to the given data item to the data file for automatically persisting in one of the plurality of associated data ranges in the data file, wherein automatically persisting comprises initiating a live update to the one of the plurality of associated data ranges in the data file, the live update comprising automatically changing the data in the one of the plurality of associated data ranges in the data file, the changed data comprising data associated with a section of the data file; and
sending data associated with the edited associated data range across a data link to the associated data range to replace the data in the one of the plurality of associated data ranges to a state prior to the edits being received for the given data item displayed in the document.

9. The computer-readable storage medium of claim 8, further comprising providing an electronic file container for containing the XML structure file and the data file.

10. The computer-readable storage medium of claim 9, whereby upon selection of the electronic file container, providing access to each of the XML structure file and the data file.

11. The computer-readable storage medium of claim 9, further comprising allowing access to the data file independent of the XML structure file for editing data contained in the data file.

12. The computer-readable storage medium of claim 8, whereby establishing a link from a given XML element contained in the XML structure file to a corresponding data range contained in the data file includes establishing an XPath from each XML element contained in the XML structure file that is linked to a corresponding data range contained in the data file.

13. The computer-readable storage medium of claim 8, whereby one or more XML elements contained in the XML structure file are not linked to associated data ranges contained in the data file, the one or more non-linked XML elements being applied for presentation and layout of the document.

* * * * *